Figure 1:
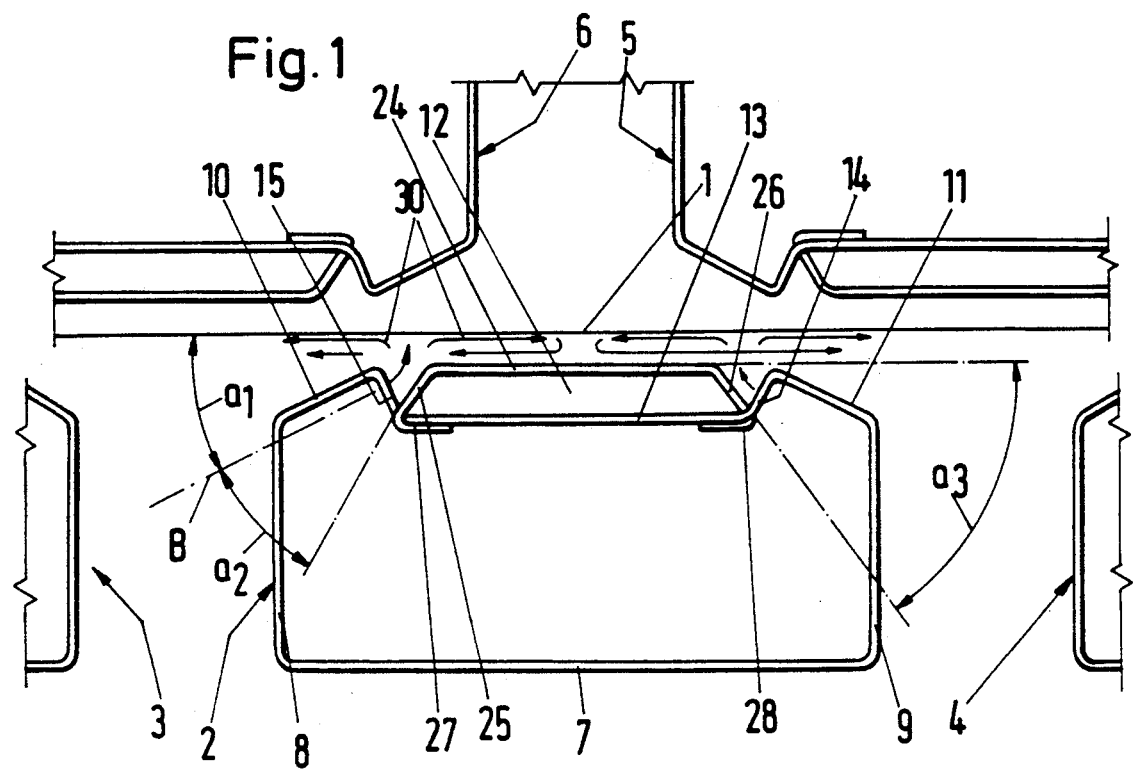

United States Patent [19]

Vits

[11] Patent Number: 5,028,173
[45] Date of Patent: Jul. 2, 1991

[54] APPARATUS FOR THE FLOATABLE GUIDING OF WEBS OF MATERIAL BY AIR BLOWN AGAINST THE WEB

[76] Inventor: Hilmar Vits, Hüschelrath 16, D-5653 Leichlingen, Fed. Rep. of Germany

[21] Appl. No.: 472,892

[22] Filed: Jan. 31, 1990

[30] Foreign Application Priority Data

Feb. 17, 1989 [DE] Fed. Rep. of Germany ....... 3904774

[51] Int. Cl.$^5$ ............................................. B65H 20/14
[52] U.S. Cl. ...................................... 406/86; 34/156; 226/97
[58] Field of Search ............... 34/156; 226/97; 406/86

[56] References Cited

U.S. PATENT DOCUMENTS

| 4,197,971 | 4/1980 | Stibbe | 34/156 X |
|---|---|---|---|
| 4,290,210 | 9/1981 | Johansson | 226/97 X |
| 4,384,666 | 5/1983 | Koponen et al. | 226/97 |
| 4,414,757 | 11/1983 | Whipple | 226/97 X |
| 4,836,429 | 6/1989 | Nakashima | 226/97 X |
| 4,837,947 | 6/1989 | Kriegler | 226/97 X |
| 4,854,052 | 8/1989 | Korpela | 34/156 X |

Primary Examiner—Joseph F. Peters, Jr.
Assistant Examiner—Carla Mattix
Attorney, Agent, or Firm—Marmorek, Guttman & Rubenstein

[57] ABSTRACT

The invention relates to an apparatus for the floatable guiding of webs of material by air blown against the web. The apparatus comprises blowing boxes 2-6 disposed offset in relation to one another above and below the web 1 of material. Each blowing box 2-6 has two opposite rows of blowing apertures 21 whose blowing direction encloses an acute angle a2 with a deflecting surface 25, 26 which adjoins the edge of the blowing aperture 21 remote from the web 1 of material. The deflecting surface 25 also encloses an acute angle a3 with the web 1 of material. The two acute angles a2, a3 are so selected that the air blown out of the blowing apertures 21 is guided away the deflecting surfaces 25 and against the web 1 of material, where it spreads out in the form of a source flow 30. In this way both a strong air cushion supporting the web 1 of the material is obtained and also a high heat transfer at the web 1 of material and a clearly-defined flow of the blown air from the air cushion.

12 Claims, 1 Drawing Sheet

APPARATUS FOR THE FLOATABLE GUIDING OF WEBS OF MATERIAL BY AIR BLOWN AGAINST THE WEB

For decades so-called air-cushion nozzles have been widely adopted in practice for the floatable guiding of webs of material. The nozzles comprise a blowing box formed with two opposite blowing slots or rows of blowing apertures, from which air is blown at an acute angle against the web of material. The blown air forms between the blowing slots, a plate disposed therebetween and a web of material, an air-cushion which supports the web of material. Preferably such blowing boxes are disposed above and below the web of material and are offset in relation to one another in the direction in which the web travels. In this arrangement the web of material is guided undulatingly. Such undulating guiding is formed only with limited tensioning of the web and is desirable to reduce or prevent edge flapping, in order to ensure guiding with reliable contact.

As web tensionings become higher with increased web speeds and thinner webs, it becomes more and more difficult to meet the demand that the web of material should be guided with reliable contact and free from flapping. Shorter undulations due to a closer arrangement of the blowing boxes support thinner webs of material better, but they no longer do so if with a closer arrangement of the blowing boxes the lower blowing volume reduces the height of the undulations.

For this reason attempts have been made for many years to obtain improved methods.

To achieve stable guiding conditions in the zone of a blowing box, it is necessary on the one hand to prevent the one-sided escape of blown air from the air-cushion via a longitudinal edge, and on the other hand a flow-off of blown air from the aircushion, which is open in the direction of the web edges and is responsible for their flapping. In one prior art device (German Patent Specification 26 13 135), therefore, the blowing box is contructed asymmetrically—i.e., the blowing direction of the blowing apertures disposed at one edge is steeper than that of the blowing apertures at the other edge. This asymmetrical construction of the blowing box favours a flow-off from the air-cushion between the two longitudinal edges always via the edge having the more steeply adjusted blowing jets. There is a reduction in flow-off in the longitudinal direction of the blowing box, with the consequent tendency to edge flapping. A flow off from the air-cushion in the longitudinal direction can also be reduced by blowing agent emerging via a perforation in a cover disposed between the blowing apertures.

In another prior art apparatus the opposite blowing apertures are offset in relation to one another by half the pitch (distance between the blowing apertures). The blown air from the blowing apertures impinges on the web of material at a shallow angle of about 30°. Having regard to the expansion of the emerging blown jet, the distance between the blowing apertures is so selected that the blown air jets emerging from opposite blowing apertures touch one another only slightly at a tangent at the edge, but substantially flow past one another. It is true that in this way a clearly-defined flow-off of the blown air is achieved via the longitudinal edges of the blowing box without any flow-off in the longitudinal direction thereof, but it is impossible for strong air-cushions to form. If the apparatus is used for drying, heat transfer and therefore drying performance are low, due to the shallow angle at which the blowing jets impinge on the web of material (U.S. Pat. No. 3 837 551).

Starting from this last-mentioned prior art, the invention relates to an apparatus for the floatable guiding of webs by air blown against the web, comprising a number of blowing boxes which are disposed transversely of the direction of travel of the web on one or both sides and are offset in relation to one another, more particularly in the direction of travel, and each of which has on the side adjacent the web of material two rows of opposite blowing apertures offset in relation to one another by half a pitch with an interposed cover, whose edges remote from the web of material are each adjoined by a deflecting surface merging into the cover and whose blowing directions each have a component directed against the web of material and a component directed against the blowing apertures in the other row, the blown air flowing off between the blowing apertures of each row.

It is an object of the invention to provide an apparatus of the kind specified which has stronger air-cushions and a higher heat transfer than the prior art apparatus of the kind specified.

To this end according to the invention the deflecting surfaces enclose an acute angle with the blowing direction of each blowing aperture on the one hand and an acute angle with the web of material on the other, such that the blown air is deflected away from the deflecting surface and so steeply against the web of material that the air impinging on the web spreads out in all directions after the fashion of a source flow.

With the apparatus according to the invention strong air-cushions ensuring high reliability of contact are obtained due to the blown air being first deflected from the deflecting surface and then being further directed by the air-cushions steeply against the web of material. The source flow set up ensures high heat transfer. Nevertheless, the blowing agent can flow off in a clearly-defined manner in all directions, partly directly via the adjacent edge and partly through the remaining channels between the blowing apertures of each opposite row via the other edge. The blowing agent is therefore not compelled to form a main flow in the longitudinal direction of the nozzle box towards the edges of the web of material, so that edge flapping takes place.

The web of material is satisfactorily guided with reliable contact if the blowing direction encloses an acute angle between 15° and 45°, more particularly 30°, with the web of material. The acute angle between the deflecting surface and the blowing direction is 15° to 45°, more particularly 30°, while the acute angle between the deflecting surface and the web of material is 40° to 80°, more particularly 60°.

Conveniently the blowing apertures have a rectangular cross-section, their outer longitudinal side being bounded by a flank of the blowing box and their inner longitudinal side being bounded by the deflecting surface.

According to a further feature of the invention the distances between the blowing apertures of a row are 35% to 65%, more particularly 50%, of the distances between the blowing apertures of the two opposite rows of a blowing box.

The blowing box can be very simply constructed, in that the deflecting surfaces are formed by the downwardly bent edges of a substantially flat depression cover which is inserted in a depression of the blowing box, formed between the blowing apertures and having a bottom, and is attached to said bottom of the depression via tongues which are formed at the edges, extend through the blowing apertures and engage behind the bottom of the depression.

Figure 2:
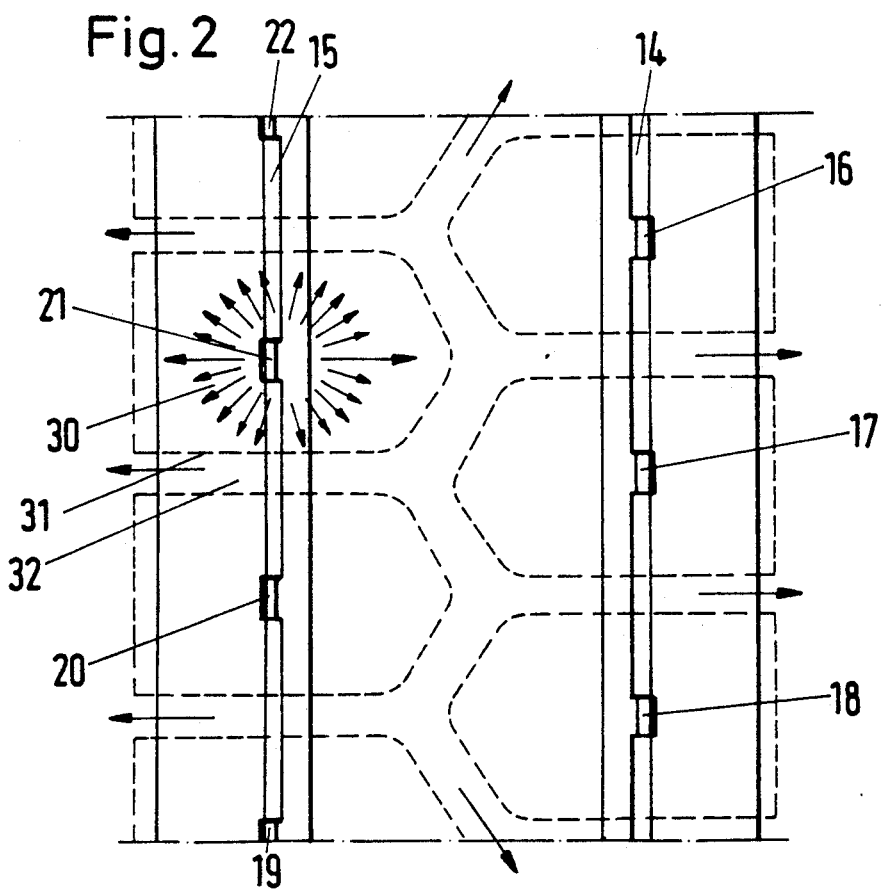

An embodiment of the invention will now be described in greater detail with reference to the drawings, wherein:

FIG. 1 shows in cross-section a detail of an apparatus for the floatable guiding of webs of material by means of air, and FIG. 2 is a plan view of a blowing box of the apparatus shown in FIG. 1.

An apparatus for the floatable guiding of a web of material by air comprises blowing boxes 2, 3, 4 disposed below a web 1 of material and blowing boxes 5, 6 disposed thereabove. All the blowing boxes 2-6 are identically constructed and are disposed transversely of the direction of travel of the web 1 of material, the lower blowing boxes 2-4 being offset in relation to the upper blowing boxes 5, 6 by half a pitch (the distance of the planes of symmetry of the blowing boxes in the direction of web travel).

Each blowing box 2 comprises a box bottom 7, two side walls 8, 9, whose upper zones adjacent the web 1 of material form inclined flanks 10, 11 directed towards one another, and a depression 12 disposed between the flanks 10, 11 and having a bottom 13. The edges of the flanks 10, 11 are connected to the bottom 13 of the depression via webs 14, 15 formed with blowing apertures 16-22 taking the form of elongate rectangular slots. Disposed in the depression 12 and in the plane of the edges of the flanks 10, 11 is a substantially flat depression cover 24, whose edges are bent down in the direction of the side remote from the web of material and form deflecting surfaces 25, 26. Disposed at the edges of the deflecting surfaces 25, 26 are tongues 27, 28 which engage through the blowing apertures 16-22 and behind the bottom 13 of the depression. The depression cover 24 with the deflecting surfaces 25, 26 is fixed in the depression 12 in this manner.

The blowing apertures 16-22 form a right angle with the adjoining flank 10, 11. The blowing direction B of each blowing aperture 16-22 extends parallel with the adjacent flank 10, 11 acting as a guide surface and encloses an acute angle a2 of 15° to 45°, more particularly 30°, with the associated deflecting surface 25, 26. The blowing direction B encloses an angle a1 of 15° to 45°, more particularly 30°, with the web 1 of material. Each deflecting surface 25, 26 encloses an angle a3 of 45° to 80°, more particularly 60°, with the web 1 of the material and the depression cover 54 disposed in parallel therewith respectively.

Due to the special construction of the blowing box, the blown air emerging from the blowing apertures 16-22 impinges on the deflecting surfaces 25, 26, which deflect the air in the direction of the web 1 of material, the width of the blown jet increasing. The deflection is boosted by the air-cushion, so that then the blown air impinges substantially perpendicularly on the web 1 of material and spreads out thereon after the fashion of a source flow 30 in all directions, as shown in FIG. 2 in the case of the blown air blown from the blowing aperture 21. Due to the elongate construction of the blowing apertures 16-22, two main jet directions are formed perpendicularly to the longitudinal axis of the blowing box. An air-cushion with sharply contoured edges 31 and flow-off channels 32 therebetween is produced in association with each blowing aperture 16-22.

The invention ensures that the web 1 of material is borne on strong air-cushions with a clearly-defined flow-off of the air from the cushions, the source flow 30 producing a high heat transfer at the web 1 of material. The stable position of the web 1 of material no longer depends on undulating guiding, so that thinner webs of material can be reliably guided with high tensile stress and an enhanced drying performance is achieved, something which has a positive effect on the possible maximum speed of the web.

I claim:

1. Apparatus for the floatable guiding of a web of material along a direction of travel by air blown against the web, comprising
  a first plurality of blowing boxes disposed on a first side of said web transversely to said direction of travel, said blowing boxes having on a side facing said web first and second rows of blowing apertures, said blowing apertures of said first row being offset by half a pitch from said blowing apertures of said second row,
  said blowing apertures of said first and second rows having blowing directions which include a component directed against said web and a component directed towards said blowing apertures of said other row,
  a cover disposed on said blowing boxes between said first and second rows of blowing apertures, said cover including deflecting surfaces associated with said blowing apertures to deflect air blown through said apertures,
  said blowing directions of said blowing apertures forming a first acute angle with said deflecting surfaces said blowing directions of said blowing apertures also forming a second acute angle with said web,
  said blowing apertures of said first row being spaced sufficiently far apart from said blowing apertures of said second row so that air blown through said blowing apertures is deflected by said deflecting surfaces and by air blown through said blowing apertures of said other row and so steeply against said web that said blown air spreads out in 360° of arc in the fashion of a source of flow, each of said blowing apertures forming a separate source of flow which supports said web as an air cushion, said blown air escaping from between said web and said blowing boxes along channels between said blowing apertures.

2. The apparatus of claim 1 comprising a second plurality of blowing boxes disposed on a second side of said web transversely to said direction of travel, said blowing boxes of said second plurality being offset from said blowing boxes of said first plurality.

3. The apparatus of claim 1 wherein said first acute angle is about 15° to 45°.

4. The apparatus of claim 1 wherein said second acute angle is about 30°.

5. The apparatus of claim 1 wherein said second acute angle is about 15° to 45°.

6. The apparatus of claim 1 wherein said second acute angle is about 30°.

7. The apparatus of claim 1 wherein said deflecting surfaces form a third acute angle with said web.

8. The apparatus of claim 7 wherein said third acute angle is about 40° to 80°.

9. The apparatus of claim 7 wherein said third acute angle is about 60°.

10. The apparatus of claim 1 wherein said blowing apertures are rectangular in cross-section with outer and inner longitudinal sides, said outer longitudinal sides being bounded by a flank of said blowing boxes and said inner longitudinal sides being bounded by said deflecting surfaces.

11. The apparatus of claim 1 wherein the distance between adjacent blowing apertures is about 35% to 65% of the distance between said first and second rows of blowing apertures.

12. The apparatus of claim 1 wherein said blowing boxes have a depression bounded by a bottom into which said cover is inserted, said deflecting surfaces being formed by downwardly bent edges of said cover, said cover being attached to said bottom of said depression via tongues which are formed at said edgese and which extend through said blowing apertures and engage behind said bottom of said depression.

* * * * *